March 10, 1931.   T. V. BUCKWALTER   1,795,471
SELF ALIGNING BEARING
Filed April 3, 1929
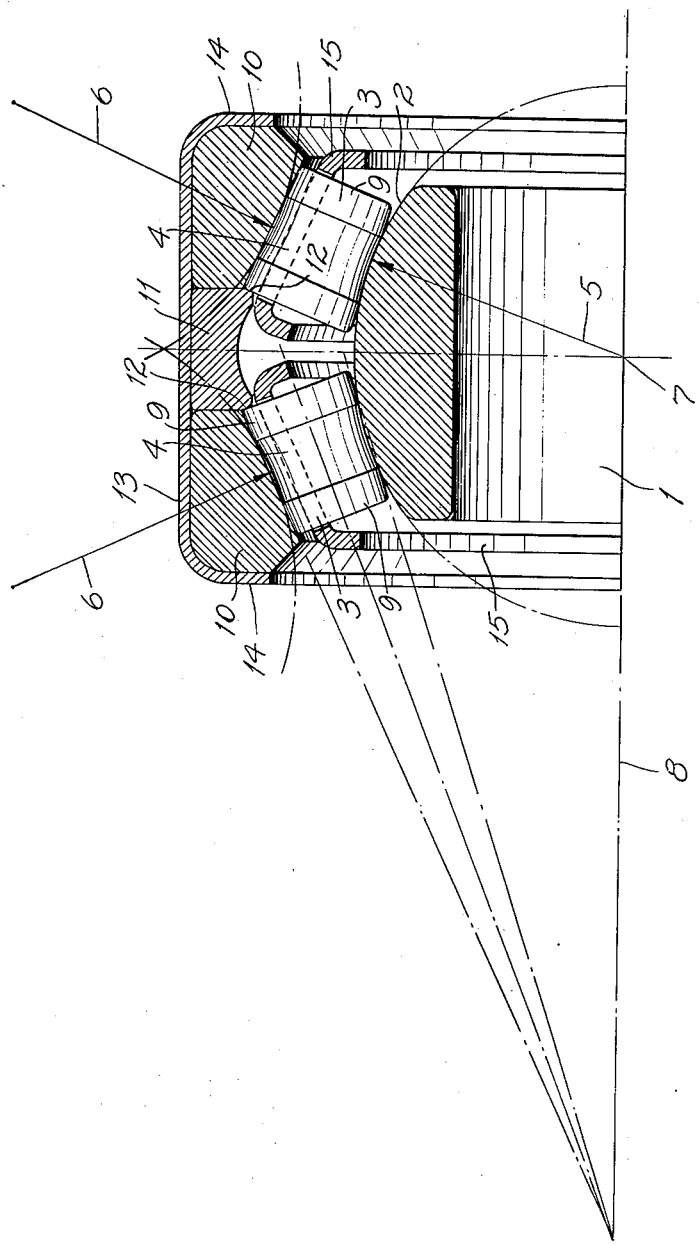
INVENTOR.
Tracy V. Buckwalter
by Carr Ham & Gravely
HIS ATTORNEYS.

Patented Mar. 10, 1931

1,795,471

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

SELF-ALIGNING BEARING

Application filed April 5, 1929. Serial No. 352,158.

My invention relates to roller bearings of the self-aligning type and has for its principal object a self-aligning bearing capable of taking thrust in both directions as well as of carrying a radial load and one that is comparatively simple to manufacture.

The invention consists in the bearing and in the parts and combinations and arrangements of parts hereinafter described and claimed.

The accompanying drawing is a half sectional view of a self-aligning roller bearing embodying my invention.

Mounted on an inner bearing member 1 having a raceway 2 that has a spherical curvature lengthwise (that is axially of the bearing) are two circular series of bearing rollers 3 of tapering form.

The middle portions 4 of said rollers are concavely curved lengthwise and rest on the spherical inner bearing member 1. Preferably the radius of curvature 5 of the inner bearing member is slightly less than the radius of curvature 6 of the concavely curved portion 4 of the bearing rollers; so that said rollers have limited or so-called point contact at their middles with the inner bearing member. The center of curvature 7 is preferably located on the axis 8 of the bearing.

The conical end portions 9 of the bearing rollers 3 engage conical bearing cups 10. Interposed between said cup members 10 is a ring 11 that has beveled edge portions 12 forming thrust ribs against which the large ends of said bearing rollers 3 abut.

The cup members 10 and said ring 11 are held together by means of a retaining sleeve 13 having its edge portions 14 bent over the edges of said cups. Suitable cages 15 are provided for the bearing rollers.

The above described bearing is entirely self-contained, it is self-aligning, that is it permits movement of the inner bearing member with respect to the bearing rollers, the rollers are guided by thrust ribs, and the contact of the rollers with the bearing members is comparatively limited, so as to reduce the friction.

What I claim is:

1. A self-aligning roller bearing comprising an inner bearing member having its outer surface convexly curved lengthwise, two spaced sets of tapering rollers thereon, said rollers having their middle portions concavely curved lengthwise, outer bearing members having conical raceways that are engaged by the conical end portions of said rollers, and thrust ribs for the large ends of said rollers.

2. A self-aligning roller bearing comprising an inner bearing member having its outer surface convexly curved lengthwise, two sets of tapering rollers thereon, said rollers having their middle portions concavely curved lengthwise, outer bearing members having conical raceways that are engaged by the conical end portions of said rollers, and a ring interposed between said cup members provided with thrust ribs engaged by the large ends of said rollers.

3. A self-aligning roller bearing comprising an inner bearing member having its outer surface convexly curved lengthwise, two sets of tapering rollers thereon, said rollers having their middle portions concavely curved lengthwise, outer bearing members having conical raceways that are engaged by the conical end portions of said rollers, and a ring interposed between said cup members provided with thrust ribs engaged by the large ends of said rollers, the radius of curvature of said inner bearing member being less than that of the concave middle portions of said bearing rollers.

Signed at Canton, Ohio, this 28th day of Mar., 1929.

TRACY V. BUCKWALTER.